United States Patent [19]

Takamatsu et al.

[11] Patent Number: 4,474,839

[45] Date of Patent: Oct. 2, 1984

[54] LARGE-AREA LIQUID CRYSTAL DISPLAY PANEL AND METHOD FOR MAKING IT

[75] Inventors: Toshiaki Takamatsu, Tenri; Fumiaki Funada, Yamatokoriyama; Shuuhei Yasuda, Nara; Masataka Matsuura, Tenri, all of Japan

[73] Assignee: Sharp Kabushiki Kaisha, Osaka, Japan

[21] Appl. No.: 449,622

[22] Filed: Dec. 14, 1982

Related U.S. Application Data

[63] Continuation of Ser. No. 201,602, Oct. 28, 1980, abandoned.

[30] Foreign Application Priority Data

Oct. 29, 1979 [JP] Japan .................... 54-139656

[51] Int. Cl.$^3$ .................................................. C09K 3/34
[52] U.S. Cl. .......................................... 428/1; 428/58
[58] Field of Search .................................. 428/1, 58

[56] References Cited

U.S. PATENT DOCUMENTS 4,007,077   2/1977   Yaguchi ....................... 428/1

Primary Examiner—Marion E. McCamish
Attorney, Agent, or Firm—Birch, Stewart, Kolasch & Birch

[57] ABSTRACT

Two or more liquid crystal units are disclosed herein to provide a greater area liquid crystal display panel. Each of the liquid crystal display units has a front support and a back support both of which are adhesively attached to each other via a proper seal resin applied on the supports along all but one side or along all but two opposite sides thereof. In an edge portion including the sides where no seal resin is applied, there is formed an opening for injection of liquid crystal material into a cavity defined between the two supports. After injection of the liquid crystal material the opening is pre-sealed with the adhesive material which may be solidified through thermal treatment or light treatment. The edge portions of the two liquid crystal display panels are situated in contact relationship with each other and bonded together by the use of the adhesive material which may be solidified through thermal treatment or light treatment.

6 Claims, 5 Drawing Figures

LARGE-AREA LIQUID CRYSTAL DISPLAY PANEL AND METHOD FOR MAKING IT

This application is a continuation of copending application Ser. No. 201,602, filed on Oct. 28, 1980 now abandoned.

BACKGROUND OF THE INVENTION

This invention relates to a large displaying area display panel having two or more liquid crystal panels adhered to each other and a method for making it.

In recent years, there has been a great trend developing toward the use of small-sized liquid crystal panels in the field of electronic wrist watches. To display a large quantity of information requires a large-area liquid crystal panel. As is well known, the manufacture of such a large-area liquid crystal panel however has the problems that it demands uniformity of photoresist coatings, light exposure and electrode films and reproductivity of fine patterns.

This kind of large-area liquid crystal panel is made in the following time-honored manner. As shown in FIG. 1, a proper seal resin 2 such as epoxy resin with a fixed width is applied on the periphery of a rectangular glass back support 1. A glass front support 3 whose size is longer than that of the back support 1 is coupled with the back support 1. After injection of liquid crystal material into a cavity defined between the two supports 1 and 3 via an opening formed in the back support 1, the opening is loaded with an indium ball (not shown) and a glass disc 5 is adhesively attached to the opening from above, thus completing a liquid crystal display unit 6. Thereafter, to provide an increased displaying area, the liquid crystal display unit is maintained in side-by-side relationship with another liquid crystal display unit 6 through the utilization of a proper adhesive.

With such an arrangement, the seal resin layers 2, 2 interpose between electrodes 7 and 7 of the two liquid crystal panels 6 and 6 and necessarily increase the electrode-to-electrode spacing, resulting in an unnatural display on the display panel.

OBJECTS AND SUMMARY OF THE INVENTION

With the foregoing in mind, it is an object of the present invention to provide a new and unique liquid crystal display panel which eliminates the above disadvantages.

Another object of the present invention is to provide a new and unique method for making a large-area and liquid crystal display panel.

According to the present invention, there are provided two or more liquid crystal units. Each of the liquid crystal display units has a front support and a back support both of which are adhesively attached to each other via a proper seal resin applied on the supports along all but one side or along all but two opposite sides thereof. In an edge portion including the sides where no seal resin is applied, there is formed an opening for injection of liquid crystal material into a cavity defined between the two supports. After injection of the liquid crystal material the opening is presealed with the adhesive material which may be solidified through thermal treatment or light treatment. The edge portions of the two liquid crystal display panels are situated in contact relationship with each other and bonded together by the use of the adhesive material which may be solidified through thermal treatment or light treatment.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
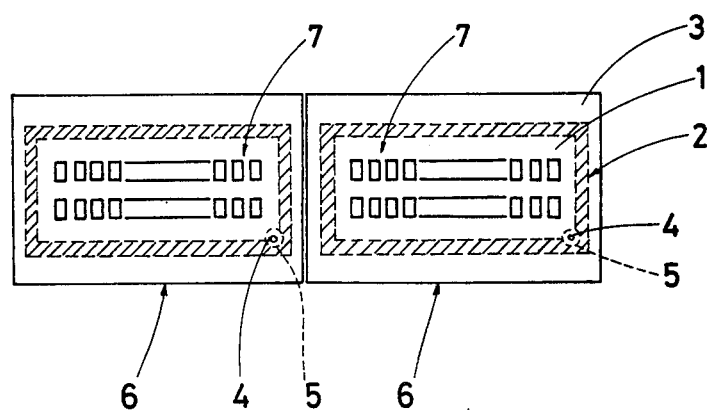
FIG. 1 is a diagrammatical view showing the manufacture of a prior art liquid crystal display panel.
Figure 2:
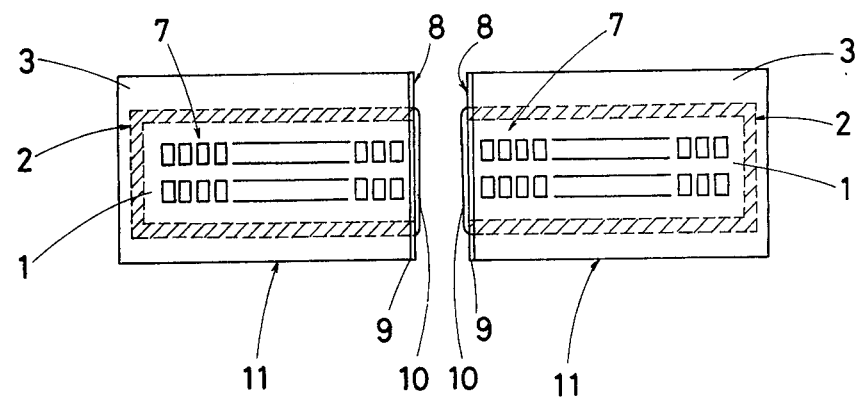
FIGS. 2 and 3 are diagrammatic views showing the manufacture of a liquid crystal display panel according to one preferred form of the present invention.

Referring now to FIG. 2, there is illustrated one preferred form of the present invention, which comprises a length of a back support 1, a seal resin material 2, a length of a front support 3, patterned display electrodes and an opposing electrode respectively mounted on the both supports and generally designated 7 in a manner similar to that in FIG. 1.

The seal resin material 2 of a given width (typically epoxy) is applied to three sides of the back support 1 but not on the remaining one side thereof. The back support 1 is held in such relationship with the front support 3 that the side of back support 1 having no seal resin material is opposite the corresponding side of front support 3 having no seal resin and the center lines of both supports being aligned.

Solder underlying layers 9 are disposed on the edge portions 8 including the shorter sides of the back and front supports 1 and 3 by deposition of a proper metal such as Au-Cr, Al-Ni and Fe-Ni.

Through an opening defined by the thickness of the seal resin material 2 between the back and front supports 1 and 3, liquid crystal material is injected into a cavity between the two supports by vacuum injection or other conventional methods.

Subsequent deposition of low melting point solder on the solder underlying layer 9 allows the opening to be pre-sealed for completion of a liquid crystal display unit 11.

Figure 3:
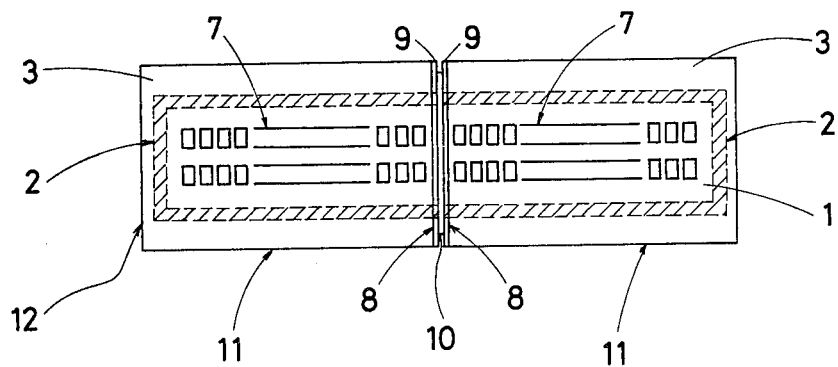

Two units 11 and 11 of the resulting liquid crystal display, as indicated in FIG. 3, are situated so closely as to pressure the opposed edge portions 8 and 8, preliminarily sealed by the low melting point solder layers 10 and 10, into contact with each other and the low melting point solder layers 10 and 10 are heated from below with an soldering iron (not shown). As a result of this, the two liquid crystal display panel units 11 and 11 are bonded together to complete a single and large-area display panel 12.

Figure 4:
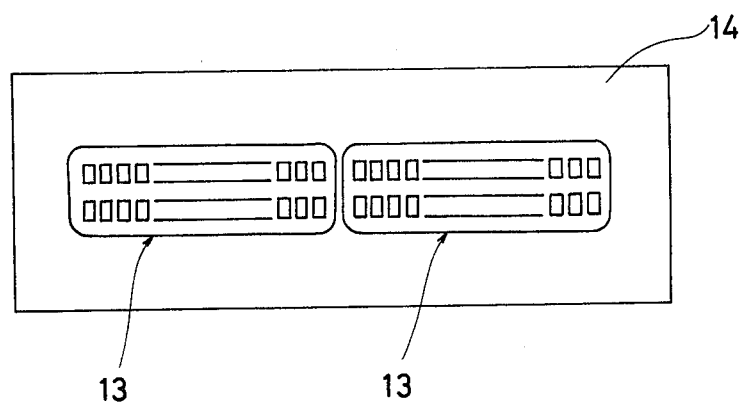
FIG. 4 is a plan view of the liquid crystal display panel with a front screen attached thereto.

It is more preferable that the liquid crystal display panel 12 be covered adhesively with a front plate 14 having display widows 13 and 13 to provide an easy-viewing display (FIG. 4).

Figure 5:
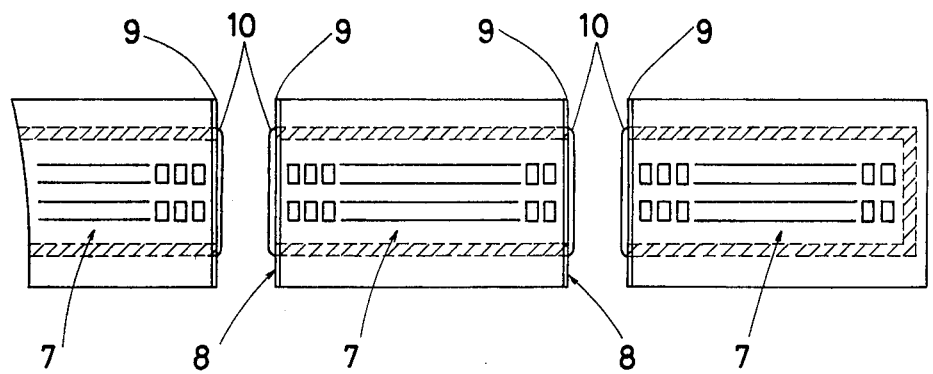
FIG. 5 is a view of another preferred form of the present invention.

It is obvious that the low melting point solder layers 10 in the above illustrated embodiment may replaced with a proper adhesive such as epoxy which is heat- or photo-solidified. In this case, there is no need to form the solder underlying layers 9 at the edge portions 8 and 8 of the liquid crystal display panel units 11 and 11 as in the above illustrated embodiment. After the back support 1 and the front support 3 are bonded through the seal resin coatings 2, liquid crystal material is injected via openings in the edge portions 8 and 8 into the units and the openings are then preliminarily sealed with pre-solidified adhesive material such as epoxy (not shown) which may be solidified by heat or light radiation. Thereafter, while the edge portions 8 and 8 are held in tight contact with each other, the adhesive seal material is heat- or light-solidified to combine the two liquid crystal display units 11 and 11 as a block unit. The procedure eliminates the need to deposit the solder underlying layers 9 and 9. Whereas the two liquid crystal display panel units 11 and 11 are bonded together in the above embodiment, it is of course possible to bond three or more of the liquid crystal display panel units 11 with a greater display area. As seen from FIG. 5, when the bonding of three of the liquid crystal panel units 11 is desired, the seal resin coating 2 of a given width is disposed along a pair of parallel longitudinal sides of the back plate 1 of the intermediate unit 11 to bond the back support 1 and the front support 3. Thereafter, an opening in one of the opposed edge portions 8 of the back and front supports 1 and 3 is temporarily sealed with low melting point solder or seal resin 10, while an opening in the other edge portion 8 is also temporarily sealed with the same material after injection of liquid crystal material therethrough. The liquid crystal display panel units 11 are located side by side in a manner similar to FIG. 2 such that the edge portions 8 are held in compressed contact with each other. By the action of the low melting point solder or adhesive 10 the three liquid crystal display panels 11 are bonded together into a single block. It is evident from the foregoing that the solder underlying layers 9 and 9 are necessary in the case of the low melting point solder.

As stated previously, the present invention provides liquid crystal display panel units wherein there is a region which does not contain any of the seal resin material adhering the front and back supports, thus minimizing the space between the display areas of the adjoining liquid crystal display panel units and providing easy-reading display pattern.

Another significant advantage of the present invention is that liquid crystal panels of a relatively large area can be easily manufactured by using and bonding two or more liquid crystal display panels which are individually relatively easy to make. It is obvious that the present invention is equally applicable to single-layer liquid crystal display panels and multi-layers panels.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display device comprising:
   two liquid crystal units, each of the liquid crystal units having a front support and a back support;
   a resin bead disposed between said front and back supports for adhesively attaching said supports to each other along each edge except one bead-free edge;
   liquid crystal material disposed between said front and back supports; and
   said liquid crystal units being adhesively joined to each other along the bead-free edges thereof.

2. A liquid crystal display device as in claim 1, wherein said joined bead-free edges are joined by means of an adhesive material comprised of a low melting point solder.

3. A liquid crystal display device as in claim 1, wherein said joined bead-free edges are joined by means of an adhesive material comprised of an epoxy resin.

4. A liquid crystal display device comprising:
   two liquid crystal end units and at least one liquid crystal intermediate unit disposed between said end units;
   each of said end units having a front support and a back support, a resin bead disposed between said front and back supports along each edge except one bead-free edge, and liquid crystal material disposed between said front and back supports;
   each of said intermediate units having a front support and a back support, a resin bead disposed between said front and back supports along each edge except two opposite bead-free edges, and liquid crystal material disposed between said front and back support; and
   said liquid crystal units being adhesively joined to each other in series with adjacent units being adhesively joined along their respective bead-free edges.

5. A liquid crystal display device as in claim 4, wherein said joined bead-free edges are joined by means of an adhesive material comprised of a low-melting point solder.

6. A liquid crystal display device as in claim 4, wherein said joined bead-free edges are joined by means of an adhesive material comprised of an epoxy resin.

* * * * *